US006856481B2

(12) United States Patent
Manjrekar et al.

(10) Patent No.: US 6,856,481 B2
(45) Date of Patent: Feb. 15, 2005

(54) APPARATUS AND METHOD FOR PROVIDING A READ SIGNAL FOR AN INFORMATION PROCESSING DEVICE

(75) Inventors: Ashish Manjrekar, Dallas, TX (US); Patrick Michael Teterud, Plano, TX (US); Indumini Ranmuthu, Plano, TX (US); Echere Iroaga, Scarborough (CA)

(73) Assignee: Texas Instruments Incorporated, Dallas, TX (US)

( * ) Notice: Subject to any disclaimer, the term of this patent is extended or adjusted under 35 U.S.C. 154(b) by 274 days.

(21) Appl. No.: 10/298,806

(22) Filed: Nov. 18, 2002

(65) Prior Publication Data

US 2004/0070861 A1 Apr. 15, 2004

Related U.S. Application Data

(60) Provisional application No. 60/419,013, filed on Oct. 15, 2002.

(51) Int. Cl.$^7$ .............................................. G11B 5/09
(52) U.S. Cl. .............................. 360/66; 360/46; 360/67
(58) Field of Search .......................... 360/66, 46, 67; 327/547; 330/127, 133, 134

(56) References Cited

U.S. PATENT DOCUMENTS

| 6,271,977 B1 | * | 8/2001 | Chung et al. | 360/46 |
| 6,429,991 B1 | * | 8/2002 | Tucker et al. | 360/66 |
| 6,462,600 B2 | * | 10/2002 | Pakriswamy | 327/307 |

* cited by examiner

*Primary Examiner*—Alan T. Faber
(74) *Attorney, Agent, or Firm*—W. Daniel Swayze, Jr.; W. James Brady; Frederick J. Telecky, Jr.

(57) ABSTRACT

An apparatus for providing a read signal at an output locus for access by an information processing device receives an input signal containing the information; the apparatus includes: (a) a read signal control unit receiving the input signal at a control unit input locus; the control unit is coupled with the output locus and controls the read signal; (b) a plurality of switches; and (c) a plurality of bias arrays coupled with the switches. A first bias array set cooperates with the plurality of switches in a first orientation to couple the first bias array set with the control unit to establish a first operational mode. A second bias array set cooperates with the plurality of switches in a second orientation to couple the second bias array set with the control unit to establish a second operational mode.

16 Claims, 3 Drawing Sheets

US 6,856,481 B2

APPARATUS AND METHOD FOR PROVIDING A READ SIGNAL FOR AN INFORMATION PROCESSING DEVICE

This application claims benefit of prior filed copending Provisional Patent Application Ser. No. 60/419,013, filed Oct. 15, 2002.

BACKGROUND OF THE INVENTION

The present invention is directed to apparatuses for providing read signals for information processing devices. The present invention is particularly useful with preamplifier (preamp) read signal providers for reader apparatuses associated with hard disc drives in computers and similar products.

Preamp reader output common mode voltage (read signal) often changes significantly in different modes of operation of the preamp devices. For example, a reader common mode voltage output signal commonly spikes or varies when the preamp reader device changes operating modes, such as when changing from a normal read mode to a non-read mode. Such sharp variations in value of common mode voltage output signal require that the signal be permitted to settle before it is useful in information conveying operations. That is, perturbations and deviations must settle or damp to within acceptable limits in order that information conveyed by the output signal may be regarded as accurate. Time required for settling or damping such perturbations is time during which an information processing device using the reader output signal cannot operate. That is, read time is lengthened and response time is longer. In the present marketplace that requires ever faster response times a need for such settling is a waste of capacity if it can be avoided.

One significant source of such perturbations, and their consequent required settling time, has been rooted in a failure to maintain reader common mode voltage output signals at substantially constant levels in various modes of operation of preamp devices. That is, while common mode voltage output signals are maintained level during read mode operations, during non-read mode operations prior art apparatuses only kept the common mode voltage output signals from rising above a predetermined limit. There was no prevention against the output voltage signal's reducing in value. As a consequence, when a preamp device configured according to the prior art was in a non-read mode, the common mode voltage output signal was kept below a predetermined value, but often drifted to a lower value than was required for that signal during a normal read mode operation. As a consequence, when the apparatus changed to a normal read mode operation, there was a sudden shift of the common mode voltage output signal from its relatively low value upward to the required level (commonly set by industry standards on a device-type basis) for normal read mode operations. This sudden shift was manifested in significant perturbations that required settling or damping before reliable information could be gleaned from the signal. The resulting unnecessary delays in response times in reading information conveyed by the output signals involved with the common mode output read signals adversely affected product performance.

Some industry specifications require that a read signal be provided for a hard disk drive product at a predetermined common mode voltage at a predetermined current drive, often at a current drive of approximately 5 ma (milliamps). Prior art preamp reader devices commonly draw approximately 12 ma–15 ma in order to reliably provide the required industry standard 5 ma signal at an output locus. It is inefficient to require a similar level of power consumption in a non-read mode. However, it is necessary (as discussed above) to maintain the output common mode voltage signal at a substantially constant level in such non-read modes of operation. This has been another problem in apparatuses configured according to the prior art.

There is a need for a common mode voltage signal apparatus configured for providing information contained in an input signal for use by an information processing device that can keep the common mode output voltage signal level substantially constant in various operational modes.

There is also a need for a common mode voltage signal apparatus configured for providing information contained in an input signal for use by an information processing device that can consume less power during non-read modes of operation while keeping the common mode output voltage signal level substantially constant.

The present invention solves both dilemmas—lower power consumption during non-read modes of operation while keeping the common mode output voltage signal level substantially constant. The preferred embodiment of the apparatus of the present invention can reliably provide a level-voltage signal at an output locus of a preamp reader device in a non-read mode while drawing less than 1 ma.

SUMMARY OF THE INVENTION

An apparatus for providing a read signal at an output locus for access by an information processing device receives an input signal containing the information; the apparatus includes: (a) a read signal control unit receiving the input signal at a control unit input locus; the control unit is coupled with the output locus and controls the read signal; (b) a plurality of switches; and (c) a plurality of bias arrays coupled with the switches. A first bias array set cooperates with the plurality of switches in a first orientation to couple the first bias array set with the control unit to establish a first operational mode. A second bias array set cooperates with the plurality of switches in a second orientation to couple the second bias array set with the control unit to establish a second operational mode.

In a preferred embodiment of the present invention, the apparatus operates at a first power level to present the read signal at a defined common mode voltage value at the output locus when in the first operational mode, and the apparatus operates at a second power level to present the read signal substantially at the defined common mode voltage value at the output locus when in the second operational mode.

It is, therefore, an object of the present invention to provide an apparatus and method for providing a read signal for an information processing device that keeps common mode output voltage signals substantially constant during a variety of operational modes.

It is a further object of the present invention to provide an apparatus and method for providing a read signal for an information processing device that can consume less power during non-read modes of operation while keeping the common mode output voltage signal level substantially constant.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Figure 1:
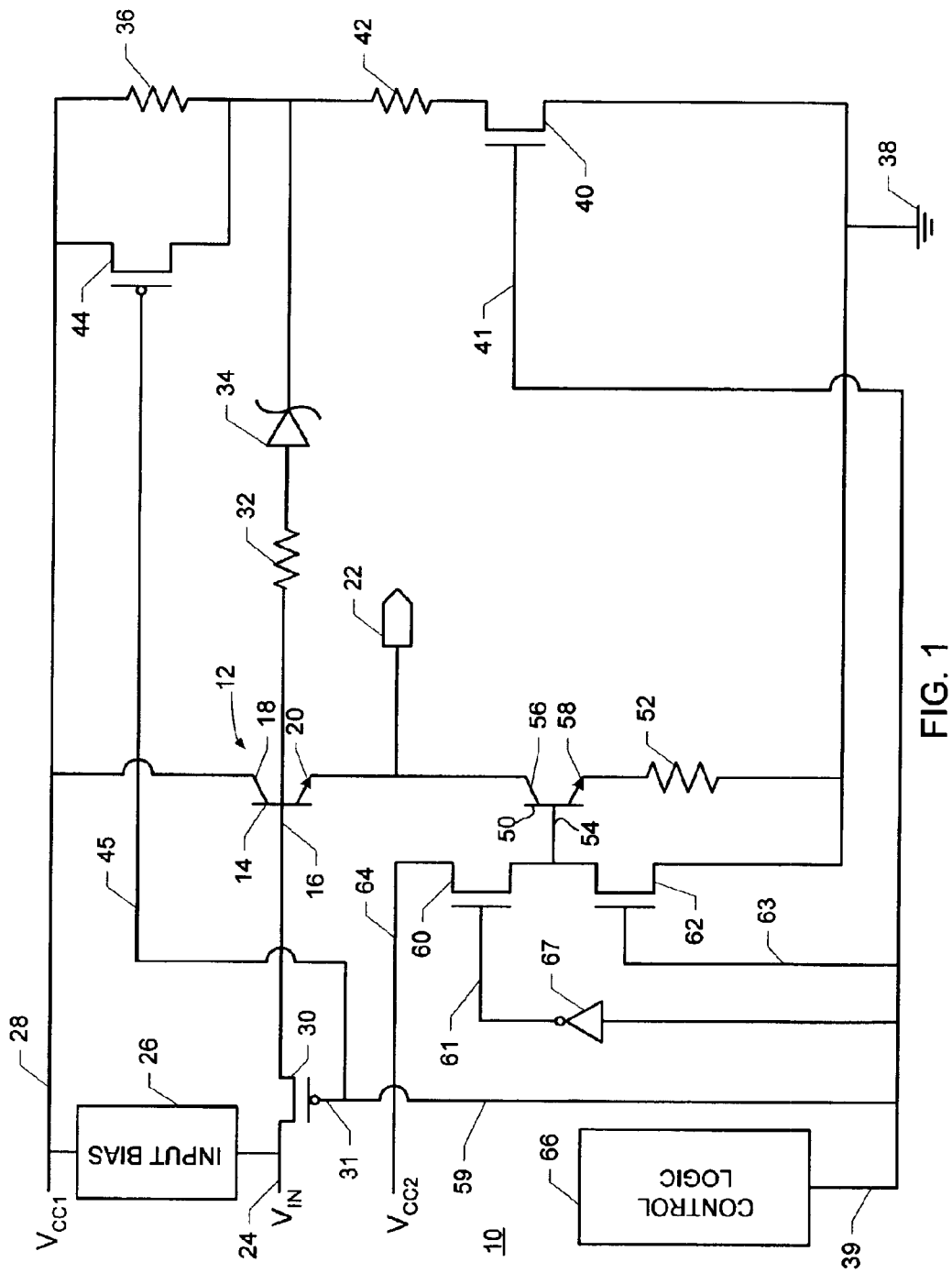
FIG. 1 is an electrical schematic diagram of a representative preamplifier for a read signal provider for a reader apparatus constructed according to the prior art.

FIG. 1 is an electrical schematic diagram of a representative preamplifier for a read signal provider for a reader apparatus constructed according to the prior art. In FIG. 1, a preamp (preamplifier) reader apparatus 10 includes a read signal driver or control unit 12 embodied in a transistor 14 having a base 16, a collector 18 and an emitter 20. Emitter 20 is coupled with an output locus or terminal 22. An input signal $V_{IN}$ is applied at an input locus 24. Input signal $V_{IN}$ contains information that is read at output locus 22 by an information processing device coupled with output locus 22, such as a read channel device (not shown in FIG. 1). An input bias signal is also applied at input locus 24 from an input bias unit 26 coupled with a supply line 28 providing a supply voltage $V_{CC1}$.

Input locus 24 is switchingly coupled with base 16 via a switch 30. Base 16 is also coupled with supply line 28 via a resistor 32, a Zener diode 34 and a resistor 36. Base 16 is switchingly coupled with ground 38 via a switch 40 and a resistor 42. A switch 44 is coupled to switchingly bypass resistor 36.

Emitter 20 is switchingly coupled with ground 38 via a transistor 50 and a resistor 52. Transistor 50 has a base 54, a collector 56 and an emitter 58. Base 54 is coupled with two switches 60, 62. Switch 60 switchingly couples base 54 with a bias voltage $V_{CC2}$ on a bias signal line 64. Switch 62 switchingly couples base 54 with ground 38.

A control logic unit 66 controls switching operation of switches 30, 40, 44, 60, 62 via gating signals provided via switch control lines 39, 59, 31, 41, 45, 61, 63. Gating signals provided by control logic unit 66 on lines 39, 59, 31, 45 are the same signal as they emanate from control logic unit 66 on common lines 39, 59. Switch 30 is embodied in a PMOS (p-channel metal-oxide-silicon) transistor; switch 44 is embodied in a PMOS transistor. Gating signals provided by control logic unit 66 on lines 39, 59, 31, 41 are the same signal as they emanate from control logic unit 66 on common line 39. Switch 40 is embodied in an NMOS (n-channel metal-oxide silicon) transistor and therefore is in an opposite state as switch 30 in response to control signals provided by control logic unit 66 on lines 39, 41. For that reason, switches 30, 40 will always be in opposite states—OPEN or CLOSED—in response to control signals provided by logic control unit 66.

Signals appearing on line 61 will always be opposite of signals appearing at lines 39, 41, 59, 31, 45 because an inverter 67 is provided in line 61. Signals appearing on line 63 will always be the same as signals appearing at lines 39, 41, 59, 31, 45 because line 63 is connected in common with lines 39, 41, 59, 31, 45. Switches 60, 62 are each embodied in an NMOS transistor. Since signals appearing on lines 61, 63 are assured to be opposite because of the provision of inverter 67, switches 60, 62 will always be in opposite states—OPEN or CLOSED—in response to control signals provided by logic control unit 66

The operational employment of switches 30, 40, 44, 60, 62 may be summarized in Table 1:

TABLE 1

| MODE | Switch 30 | Swith 40 | Switch 44 | Switch 60 | Switch 62 |
|---|---|---|---|---|---|
| Normal Read | Closed | Open | Closed | Closed | Open |
| Non-Read | Open | Closed | Open | Open | Closed |

Thus, in a normal read mode apparatus 10 is configured with base 16 coupled with input locus 24 for receiving input signal $V_{IN}$ biased by input bias signals provided by input bias unit 26. Base 16 does not electrically interact with (e.g., is not biased by) resistors 32, 36, 42, Zener diode 34 because switch 40 is open. In a normal read mode switch 62 is open and switch 60 is closed. By such a configuration, base 54 of transistor 50 is coupled with bias signal line 64 to apply bias voltage $V_{CC2}$ to base 54 to render transistor 50 conductive to couple emitter 20 to ground 38 via resistor 52. In such a configuration, apparatus 10 provides the requisite voltage signal level at output locus 22 to meet industry standards and to permit proper operation of apparatus 10 in conjunction with an information processing device receiving or reading signals at output locus 22 (not shown in FIG. 1).

In a non-read mode apparatus 10 is configured with base 16 isolated from input locus 24. Base 16 is included in an electrical circuit involving resistors 32, 36, 42 and Zener diode 34 because switch 40 is closed. Resistor 32 and Zener diode 34 cooperate to limit the upward excursion of voltage level at base 16, thereby limiting upward excursion of common mode voltage output signal at output locus 22. In a non-read mode switch 62 is closed and switch 60 is open. By such a configuration, base 54 of transistor 50 is grounded so that transistor 50 is rendered non-conductive. Emitter 20 is therefore isolated from ground 38. In such a configuration, apparatus 10 limits upward excursion of voltage signal level at output locus 22. However, because output locus 22 is isolated from ground 38 in the non-read mode configuration of FIG. 1, voltage levels at output locus 22 may drift downward from levels that were established at output locus 22 during normal read mode operation. As a consequence, when apparatus 10 is returned to a normal read mode operation configuration, there can be a significant upward shift of voltage signal level at output locus 22. Such a sudden shift in voltage signal level occasions perturbations that must settle to within predetermined excursion limits before reliable reading of information signals at output locus 22 may be undertaken. As mentioned earlier herein, time required for settling or damping such perturbations is time during which an information processing device using the reader output signal cannot operate. That is, read time is lengthened and response time is longer. In the present marketplace that requires ever faster response times a need for such settling is a waste of capacity if it can be avoided.

Figure 2:
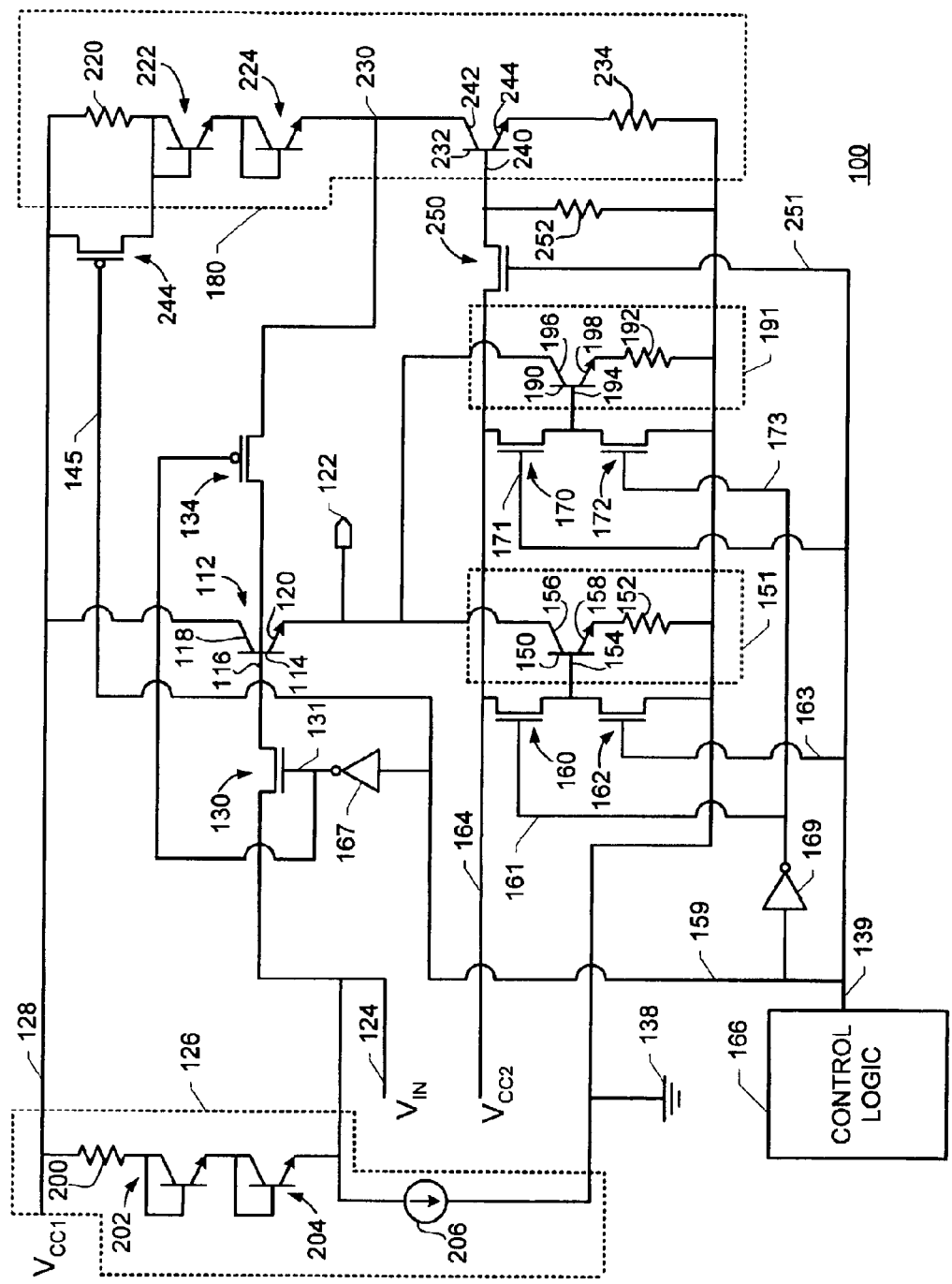
FIG. 2 is an electrical schematic diagram of a preferred embodiment of a preamplifier for a read signal provider for a reader apparatus constructed according to the apparatus of the present invention.

FIG. 2 is an electrical schematic diagram of a preferred embodiment of a preamplifier for a read signal provider for a reader apparatus constructed according to the apparatus of the present invention. In FIG. 2, a preamp (preamplifier) reader apparatus 100 includes a read signal control unit 112 embodied in a transistor 114 having a base 116, a collector 118 and an emitter 120. Emitter 120 is coupled with an output locus or terminal 122. An input signal $V_{IN}$ is applied at an input locus 124. Input signal $V_{IN}$ contains information that is read at output locus 122 by an information processing device coupled with output locus 122, such as a read channel device (not shown in FIG. 2). An input bias signal is also applied at input locus 124 from an input bias unit 126 coupled with a supply line 128 providing a supply voltage $V_{CC1}$. Input bias unit 126 includes a resistor 200 and diode configured transistors 203, 204 series-connected between supply line 128 and input locus 124. Input bias unit 126 also includes a current source 206 coupled between ground 138 and input locus 124.

Input locus 124 is switchingly coupled with base 116 via a switch 130. Base 116 is also coupled with an alternate bias unit 180 via a switch 134. Alternate bias unit 180 includes a resistor 220 and diode configured transistors 222, 224 series-connected between supply line 128 and a reference locus 230. Resistor 220 may be bypassed by closing a switch 244. Alternate bias unit 180 also includes a switchable connection to ground 138 via a transistor 232 and a resistor 234. Transistor 232 has a base 240, a collector 242 and an emitter 244. Base 240 is switchingly coupled with a bias voltage $V_{CC2}$ on a bias signal line 164 via a switch 250. A resistor 252 pulls base 240 to ground 138 when switch 250 is opened. Emitter 244 is coupled with resistor 234.

Preferably resistor 220 and diodes 222, 224 cooperate with transistor 232 and resistor 234 to substantially duplicate the bias voltage seen by base 116 when apparatus 100 is in the non-read mode as is seen by base 116 when apparatus 100 is a normal read mode. Input bias unit 126 and alternate bias unit 180 are similarly constructed for that purpose. Input bias unit 126 includes resistor 200 in series with diode-configured transistors 202, 204 between supply line 128 and base 116 when apparatus 100 is in a normal read mode (i.e., with switch 130 closed and switch 134 open), and input bias circuit 126 includes current source 206 coupled between ground 138 and base 116 when apparatus 100 is in a normal read mode. Similarly, alternate bias unit 180 includes resistor 220 in series with diode-configured transistors 222, 224 between supply line 128 and base 116 when apparatus 100 is in a non-read mode (i.e., with switch 130 open and switch 134 closed), and alternate bias circuit 180 includes resistor 234 coupled between ground 138 and base 116 via transistor 232 when apparatus 100 is in a non-read mode. In a normal read mode, switch 250 is open and base 240 of transistor 232 is pulled to ground 138.

Emitter 120 is switchingly coupled with ground 138 via one of two alternate output locus bias units 151, 191. Output locus bias unit 151 includes a transistor 150 and a resistor 152. Transistor 150 has a base 154, a collector 156 and an emitter 158. Base 154 is coupled with two switches 160, 162. Switch 160 switchingly couples base 154 with a bias voltage $V_{CC2}$ on bias signal line 164. Switch 162 switchingly couples base 154 with ground 138. Output locus bias unit 191 includes a transistor 190 and a resistor 192. Transistor 190 has a base 194, a collector 196 and an emitter 198. Base 194 is coupled with two switches 170, 172. Switch 170 switchingly couples base 194 with a bias voltage $V_{CC2}$ on bias signal line 164. Switch 172 switchingly couples base 194 with ground 138.

A control logic unit 166 controls operation of switches 130, 134, 160, 162, 170, 172, 244, 250 via gating signals provided via switch control lines 139, 159, 131, 145, 161, 163, 171, 173, 251. Gating signals provided by control logic unit 166 on lines 139, 159, 145, 163, 171, 251 are the same signal as they emanate from control logic unit 166 on common line 139. Signals on switch control line 131 are opposite with signals on signal line 159 because of inverter 167 in line 159. Signals on switch control lines 161, 173 are opposite with signals on signal line 159 because of inverter 169. Switch 130 is embodied in an NMOS (n-channel metal-oxide-silicon) transistor; switch 244 is embodied in a PMOS (p-channel metal-oxide-silicon) transistor. For that reason, and because of inverter 167 in series with switch 130, switch 130 and switch 244 will respond alike to similar gating signals from control logic unit 166. Thus, switches 130, 244 will always be in the same state—OPEN or CLOSED—in response to control signals provided by logic control unit 166 via common lines 139, 159, 131, 145. Gating signals provided by control logic unit 166 on lines 139, 159, 145, 163, 171, 251 are the same signal as they emanate from control logic unit 166 on common line 139. Switch 250 is embodied in an NMOS transistor and therefore is in an opposite state as switch 244 in response to control signals provided by control logic unit 166 on lines 139, 145, 251. For that reason, switches 244, 250 will always be in opposite states—OPEN or CLOSED—in response to control signals provided by logic control unit 166.

Signals appearing on line 161 will always be opposite of signals appearing at line 163 because signals on line 161 pass via inverter 169 and signals appearing at line 163 are not inverted. Switches 160, 162 will always be in opposite states—OPEN or CLOSED—in response to control signals provided by logic control unit 166. Similarly, signals appearing on line 171 will always be opposite of signals appearing at line 173 because signals on line 173 pass via inverter 169 and signals appearing at line 171 are not inverted. Switches 170, 172 will always be in opposite states—OPEN or CLOSED—in response to control signals provided by logic control unit 166. By such a switching arrangement, it is assured that only one of transistors 150, 190 sees an appropriate bias applied to its respective base 154, 194 to render the respective transistor 150, 190 conductive. When transistor 150 is conductive, resistor 152 is coupled with emitter 120 and biases output locus 122. When transistor 150 is conductive, base 194 of transistor 190 is grounded via switch 172 and does not conduct, thereby isolating resistor 192 from output locus 122. When transistor 190 is conductive, resistor 192 is coupled with emitter 120 and biases output locus 122. When transistor 190 is conductive, base 154 of transistor 150 is grounded via switch 162 and does not conduct, thereby isolating resistor 152 from output locus 122.

The operational employment of switches 130, 134, 160, 162, 170, 172, 244, 250 may be summarized in Table 2:

TABLE 2

| MODE | Switch 130 | Switch 134 | Switch 244 | Switch 160 | Switch 162 | Switch 170 | Switch 172 | Switch 250 |
|---|---|---|---|---|---|---|---|---|
| Normal Read Mode | Closed | Open | Closed | Closed | Open | Open | Closed | Open |
| Non Read Mode | Open | Closed | Open | Open | Closed | Closed | Open | Closed |

Thus, in a normal read mode apparatus 100 is configured with base 116 coupled with input locus 124 for receiving input signal $V_{IN}$ biased by input bias signals provided by input bias unit 126. Base 116 does not electrically interact with alternate bias unit 180 because switch 134 is open. In a normal read mode switch 162 is open and switch 160 is closed. By such a configuration, base 154 of transistor 150 is coupled with bias signal line 164 to apply bias voltage $V_{CC2}$ to base 154 to render transistor 150 conductive to couple emitter 120 to ground 138 via resistor 152. Further in a normal read mode switch 170 is open and switch 172 is closed. By such a configuration, base 194 of transistor 190 is coupled with ground 138 to render transistor 190 non-conductive to isolate emitter 120 from resistor 192. Switch 244 is closed to ensure that junction 230 does not float but rather remains at a predetermined voltage set by bias voltage $V_{CC1}$ and diodes 222, 224. In such a configuration, apparatus 10 provides the requisite voltage signal level at output locus 122 to meet industry standards and to permit proper operation of apparatus 100 in conjunction with an information processing device receiving or reading signals at output locus 122 (not shown in FIG. 2).

In a non-read mode apparatus 100 is configured with base 116 isolated from input locus 124 because switch 130 is open. Base 116 is coupled with alternate bias unit 180 because switch 134 is closed. The voltage at junction 230 is controlled. As mentioned previously, preferably resistor 220 and diodes 222, 224 cooperate with transistor 232 and resistor array 234 to substantially duplicate the bias voltage seen by base 116 when apparatus 100 is in the non-read mode as is seen by base 116 when apparatus 100 is a normal read mode. Note the similarity of components contained in input bias unit 126 and alternate bias unit 180. Input bias unit 126 includes resistor 200 in series with diode-configured transistors 202, 204 between supply line 128 and base 116 when apparatus 100 is in a normal read mode (i.e., with switch 130 closed and switch 134 open). Further, input bias circuit 126 includes current source 206 coupled between ground 138 and base 116 when apparatus 100 is in a normal read mode. Similarly, alternate bias unit 180 includes resistor 220 in series with diode-configured transistors 222, 224 between supply line 128 and base 116 when apparatus 100 is in a non-read mode (i.e., with switch 130 open and switch 134 closed). Further, alternate bias circuit 180 includes resistor array 234 coupled between ground 138 and base 116 via transistor 232 when apparatus 100 is in a normal read mode.

Preferably component values are chosen so that input bias unit 126 permits apparatus 100 to present common mode voltage signals at output locus 122 that meet industry standards. It is the experience of the inventors that such a configuration draws approximately 12 ma–15 ma when operating in a normal read mode. It is further preferred that component values be chosen so that alternate bias unit 180 permits apparatus 100 to maintain common mode voltage signals at output locus 122 at voltage levels substantially equal with voltage levels established during normal read mode operations, but that will permit apparatus 100 to consume significantly less power during non-read operations. It is the experience of the inventors that apparatus 100 (FIG. 2) meets this desired design requirement. Apparatus 100 has been successfully configured by the inventors to draw less than 1 ma when operating in a non-read mode. Achieving such a low power apparatus and employing it in a manner appropriate for efficient operations according to the method of the present invention limits excursions of common mode output voltage signals at output locus 122 in upward variations as well as in downward variations. Accordingly, limiting common mode output voltage signal variations at output locus 122 is significantly improved over prior art apparatus 10 (FIG. 1). A significant beneficial result is that less time must be allowed for damping signals after changing operational modes, information processing products using apparatus 100 have faster read and response times than are available using apparatus 10 (FIG. 1; prior art).

Figure 3:
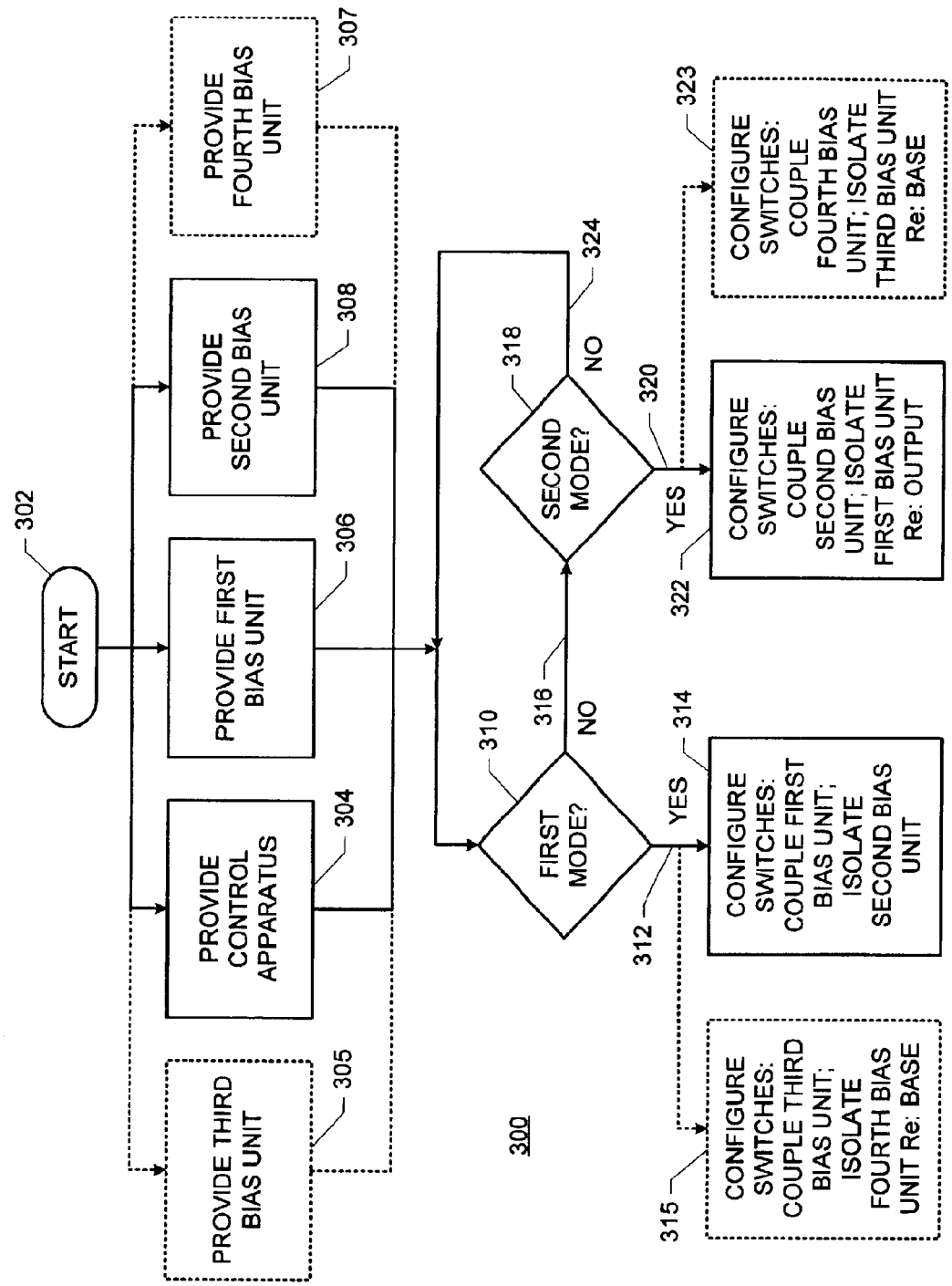
FIG. 3 is a flow diagram illustrating the preferred embodiment of the method of the present invention.

FIG. 3 is a flow diagram illustrating the preferred embodiment of the method of the present invention. In FIG. 3, a method 300 for providing a read signal for an information processing device in at least two operational modes begins at a START locus 302. Method 300 begins with the step of, (a) in no particular order: (1) Providing a read signal control apparatus, as indicated by a block 304. The read signal control apparatus is configured for receiving an input signal containing the information at a read signal control base terminal. The input signal is received at a read signal control supply terminal and the read signal representing the information is presented at a read signal control output terminal for access by the information processing device. (2) Providing a first bias unit as indicated by a block 306. The first bias unit is switchingly coupled with the read signal output terminal via a first switch unit. (3) Providing a second bias unit as indicated by a block 308. The second bias unit is switchingly coupled with the read signal output terminal via a second switch unit.

In an alternate embodiment of method 300 a third bias unit may be provided, as indicated in dotted lines by a block 305. The third bias unit is switchingly coupled with the read signal control base terminal via a third switch unit. Further in an alternate embodiment of method 300, a fourth bias unit may be provided, as indicated in dotted lines by a block 307. The fourth bias unit is switchingly coupled with the read signal control base terminal via a fourth switch unit.

Method 300 continues by posing a query whether the providing is to be effected in a first operational mode of the at least two operational modes, as indicated by a query block 310. If the providing is to be effected in the first operational mode, method 300 proceeds via YES response line 312 to configure the first switch unit and the second switch unit to electrically couple the first bias unit with the read signal output terminal and to electrically isolate the second bias unit from the read signal output terminal, as indicated by a block 314. In an alternate embodiment of method 300, there may additionally be a step to configure the third switch unit and the fourth switch unit to electrically couple the third bias unit with the read signal control base terminal and to electrically isolate the fourth bias unit from the read signal control base terminal, as indicated by a dotted line block 315.

If the providing is not to be effected in the first operational mode, method 300 proceeds via NO response line 316 to pose a query whether the providing is to be effected in a second operational mode, as indicated by a query block 318. If the providing is to be effected in the second operational mode, method 300 proceeds via YES response line 320 to configure the first switch unit and the second switch unit to electrically couple the second bias unit with the read signal output terminal and to electrically isolate the first bias unit from the read signal output terminal, as indicated by a block 322. In an alternate embodiment of method 300, there may additionally be a step to configure the third switch unit and the fourth switch unit to electrically couple the fourth bias unit with the read signal control base terminal and to electrically isolate the third bias unit from the read signal control base terminal, as indicated by a dotted line block 323.

If the providing is not to be effected in the first operational mode, method 300 proceeds via NO response line 324 to return to inquire whether the providing is to be effected in the first operational mode, as indicated by query block 310.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

We claim:

1. An apparatus for providing a read signal for an information processing device; the apparatus receiving an input signal containing said information; the apparatus presenting said read signal at an output locus for access by said information processing device; the apparatus comprising:

(a) a read signal control unit; said read signal control unit having a read signal control base terminal, a read signal control output terminal and a read signal control supply terminal; said read signal control unit receiving said input signal at said read signal control base terminal and presenting said read signal representing said information at said read signal control output terminal;

(b) a first bias unit switchingly coupled with said read signal output terminal via a first switch unit; and (c) a second bias unit; said second bias unit being switchingly coupled with said read signal output terminal via a second switch unit; said first switch unit and said second switch unit cooperating to electrically couple said first bias unit with said read signal output terminal and to electrically isolate said second bias unit from said read signal output terminal when the apparatus is in a first operational mode; said first switch unit and said second switch unit cooperating to electrically couple said second bias unit with said read signal output terminal and to electrically isolate said first bias unit from said read signal output terminal when the apparatus is in a second operational mode.

2. An apparatus for providing a read signal for an information processing device as recited in claim 1 wherein the apparatus further comprises:

(d) a third bias unit; said third bias unit being switchingly coupled with said read signal control base terminal via a third switch unit; and (e) a fourth bias unit; said second bias unit being switchingly coupled with said read signal control base terminal via a fourth switch unit; said third switch unit and said fourth switch unit cooperating to electrically couple said third bias unit with said read signal control base terminal and to electrically isolate said fourth bias unit from said read signal control base terminal when the apparatus is in said first operational mode; said third switch unit and said fourth switch unit cooperating to electrically couple said fourth bias unit with said read signal control base terminal and to electrically isolate said third bias unit from said read signal control base terminal when the apparatus is in said second operational mode.

3. An apparatus for providing a read signal for an information processing device as recited in claim 1 wherein said second bias unit limits excursion of said read signal while the apparatus is in said second operational mode.

4. An apparatus for providing a read signal for an information processing device as recited in claim 2 wherein said second bias unit limits excursion of said read signal while the apparatus is in said second operational mode.

5. An apparatus for providing a read signal for an information processing device as recited in claim 2 wherein said fourth bias unit is configured to present substantially similar impedance to said read signal control base terminal while the apparatus is in said second operational mode as said second bias unit presents to said read signal control base terminal while the apparatus is in said first operational mode.

6. An apparatus for providing a read signal for an information processing device as recited in claim 3 wherein said fourth bias unit is configured to present substantially similar impedance to said read signal control base terminal while the apparatus is in said second operational mode as said second bias unit presents to said read signal control base terminal while the apparatus is in said first operational mode.

7. An apparatus for providing a read signal for an information processing device as recited in claim 4 wherein said fourth bias unit is configured to present substantially similar impedance to said read signal control base terminal while the apparatus is in said second operational mode as said second bias unit presents to said read signal control base terminal while the apparatus is in said first operational mode.

8. A method for providing a read signal for an information processing device in at least two operational modes; the method comprising the steps of:

(a) in no particular order:

(1) providing a read signal control apparatus configured for receiving an input signal containing said information at a read signal control base terminal, receiving a supply signal at a read signal control supply terminal, and presenting said read signal representing said information at a read signal control output terminal for access by said information processing device;

(2) providing a first bias unit switchingly coupled with said read signal output terminal via a first switch unit; and (3) providing a second bias unit switchingly coupled with said read signal output terminal via a second switch unit;

(b) if said providing is to be effected in a first operational mode of said at least two operational modes, configuring said first switch unit and said second switch unit to electrically couple said first bias unit with said read signal output terminal and to electrically isolate said second bias unit from said read signal output terminal; and (c) if said providing is to be effected in a second operational mode of said at least two operational modes, configuring said first switch unit and said second switch unit to electrically couple said second bias unit with said read signal output terminal and to electrically isolate said first bias unit from said read signal output terminal.

9. A method for providing a read signal for an information processing device in at least two operational modes as recited in claim 8 wherein the method comprises the further steps of: in no particular order as part of step (a):

(4) providing a third bias unit switchingly coupled with said read signal control base terminal via a third switch unit; and (5) providing a fourth bias unit switchingly coupled with said read signal control base terminal via a fourth switch unit; and (d) if said providing is to be effected in said first operational mode, configuring said third switch unit and said fourth switch unit to electrically couple said third bias unit with said read signal control base terminal and to electrically isolate said fourth bias unit from said read signal control base terminal; and (e) if said providing is to be effected in said second operational mode, configuring said third switch unit and said fourth switch unit to electrically couple said fourth bias unit with said read signal control base terminal and to electrically isolate said third bias unit from said read signal control base terminal.

10. A method for providing a read signal for an information processing device in at least two operational modes as recited in claim 8 wherein said second bias unit limits excursion of said read signal while the apparatus is in said second operational mode.

11. A method for providing a read signal for an information processing device in at least two operational modes as recited in claim 9 wherein said second bias unit limits excursion of said read signal while the apparatus is in said second operational mode.

12. A method for providing a read signal for an information processing device in at least two operational modes as recited in claim 9 wherein said fourth bias unit is configured to present substantially similar impedance to said read signal control base terminal while the apparatus is in said second operational mode as said second bias unit presents to said read signal control base terminal while the apparatus is in said first operational mode.

13. A method for providing a read signal for an information processing device in at least two operational modes as recited in claim 10 wherein said fourth bias unit is configured to present substantially similar impedance to said read signal control base terminal while the apparatus is in said second operational mode as said second bias unit presents to said read signal control base terminal while the apparatus is in said first operational mode.

14. A method for providing a read signal for an information processing device in at least two operational modes as recited in claim 11 wherein said fourth bias unit is configured to present substantially similar impedance to said read signal control base terminal while the apparatus is in said second operational mode as said second bias unit presents to said read signal control base terminal while the apparatus is in said first operational mode.

15. An apparatus for providing a read signal at an output locus for access by an information processing device; the apparatus receiving an input signal containing said information; the apparatus comprising:

(a) a read signal control unit; said read signal control unit receiving said input signal at a read signal control unit input locus; read signal control unit being coupled with said output locus and controlling said read signal;

(b) a plurality of switching units;

(c) a plurality of bias arrays coupled with said plurality of switching units;

(d) a first selected bias array set of said plurality of bias arrays cooperating with said plurality of switching units in a first orientation to couple said first selected bias array set with said read signal control unit to establish the apparatus in a first operational mode; and (e) a second selected bias array set of said plurality of bias arrays cooperating with said plurality of switching units in a second orientation to couple said second selected bias array set with said read signal control unit to establish the apparatus in a second operational mode;

the apparatus operating at a first power level to present said read signal at a defined common mode voltage value at said output locus when in said first operational mode; the apparatus operating at a second power level to present said read signal substantially at said defined common mode voltage value at said output locus when in said second operational mode.

16. An apparatus for providing a read signal at an output locus for access by an information processing device as recited in claim 15 wherein the apparatus limits excursion of said read signal from said defined common mode voltage value while the apparatus is in said second operational mode.

* * * * *